United States Patent
Tseng et al.

(10) Patent No.: US 7,607,029 B2
(45) Date of Patent: Oct. 20, 2009

(54) PCI EXPRESS LINK STATE MANAGEMENT SYSTEM AND METHOD THEREOF

(75) Inventors: Wen-Yu Tseng, Taipei (TW); Yuan-Zong Cheng, Taipei (TW)

(73) Assignee: VIA Technologies, Inc., Taipei (TW)

( * ) Notice: Subject to any disclaimer, the term of this patent is extended or adjusted under 35 U.S.C. 154(b) by 728 days.

(21) Appl. No.: 11/430,122

(22) Filed: May 9, 2006

(65) Prior Publication Data
US 2006/0271649 A1 Nov. 30, 2006

Related U.S. Application Data

(60) Provisional application No. 60/683,313, filed on May 23, 2005.

(30) Foreign Application Priority Data
Jan. 24, 2006 (TW) .............................. 95102706 A

(51) Int. Cl.
*G06F 1/32* (2006.01)
(52) U.S. Cl. ....................................... 713/300
(58) Field of Classification Search .................. 713/300
See application file for complete search history.

(56) References Cited

U.S. PATENT DOCUMENTS

| 5,404,546 | A  | * | 4/1995 | Stewart ....................... 713/322 |
| 7,188,263 | B1 |   | 3/2007 | Rubinstein et al. |
| 7,216,245 | B2 | * | 5/2007 | Hsu et al. ..................... 713/324 |
| 7,320,080 | B2 |   | 1/2008 | Solomon et al. |
| 7,337,338 | B2 | * | 2/2008 | Chaiken et al. ............. 713/320 |
| 7,383,457 | B1 |   | 6/2008 | Knight |
| 7,469,366 | B1 | * | 12/2008 | Reed .......................... 714/704 |
| 2003/0123486 | A1 | * | 7/2003 | Lacey, III .................... 370/485 |
| 2004/0128576 | A1 |   | 7/2004 | Gutman et al. |
| 2004/0268169 | A1 |   | 12/2004 | Bashford et al. |
| 2005/0086549 | A1 |   | 4/2005 | Solomon et al. |
| 2005/0097378 | A1 | * | 5/2005 | Hwang ........................ 713/320 |

OTHER PUBLICATIONS

PCI-SIG, "PCI Express Base Specification, Revision 1.0a," Apr. 15, 2003.

* cited by examiner

*Primary Examiner*—Thomas Lee
*Assistant Examiner*—Eric Chang
(74) *Attorney, Agent, or Firm*—Bacon & Thomas, PLLC

(57) ABSTRACT

A PCI Express link state management system and method thereof is disclosed. The PCI Express link power state management system includes an upstream device, a downstream device and a link. First, the upstream device outputs a configuration request to the downstream device so as to change a device power state of the downstream device. At the time, the link is in a first link state. Next, the downstream device outputs a power entering signal to the upstream device. Following that, the upstream device outputs a power request acknowledging signal to the downstream device in response to the power entering signal and a time period is counting. Finally, the downstream device re-outputs the power entering signal if the link does not enter to an electrical idle state when the time period is expired.

20 Claims, 2 Drawing Sheets

PCI EXPRESS LINK STATE MANAGEMENT SYSTEM AND METHOD THEREOF

This application claims the benefits of U.S. provisional application Ser. No. 60/683,313, filed May 23, 2005, and Taiwan application Serial No. 95102706, filed Jan. 24, 2006, the subject matter of which are incorporated herein by reference.

BACKGROUND OF THE INVENTION

1. Field of the Invention

The invention relates in general to a power state management system and method thereof, and more particularly to a PCI Express link state (L-state) management system and method thereof.

2. Description of the Related Art

Along with technology progress, the mainstream peripheral component interconnect (PCI) of personal computers has becoming too narrow in transmission bandwidth to meet the requirement of processors and output/input devices in the future. Therefore, industrials supply a new generation of PCI Express as a standard field input/output bus for various operation platforms in the future. The main feature of PCI Express lies in the increase of performance where the single transmission rate can reach 2.5 GHz. The transmission rate can be further improved by increasing the number of lanes, such as using 4 lanes to reach 4 times of transmission rate.

The advanced configuration and power interface (ACPI) defines the power states in various situations, which are called device power states or D-states, and PCI Express further defines the power states of the links among devices, which are called link states or L-states. Besides, the link states have also corresponding relationship with the device power states.

The device power state Do represents the device operates in a normal state. When the devices are set in the D0state, the link among the devices is set in a link state L0, L0s or L1.

The device power states D1 and D2 are not defined clearly. Generally speaking, these two states save less electric power but maintain more device states. The D1 and D2 states correspond to the link state L1.

The device power state D3 implies a power off state, which includes D3cold and D3hot states. When a device is in the D3cold state, it implies the main power is not supplied to the device. When the device is in the D3hot state, it implies the main power is still supplied to the device. When the power state of devices is D3cold, if some auxiliary power is supplied to the devices, the link among the devices corresponds to a link state L3. The device power state D3hot corresponds to the link state L1 or L2/L3 ready.

The link state L0 defines the link among devices is in normal operation. During the data transmission of the link among devices, if there exists temporary idle periods, the system can enter the link state L0s to reduce power consumption.

When the link among devices is set in the link state L1, the devices have no operation requirement, and thus the required electrical power for the link among the devices can be reduced. In the meanwhile, no clock signal is triggered and the phase locked loop (PLL) is also pauses.

The link states L2 and L3 are both power-off states. The link state L2 has auxiliary power but the link state L3 has none.

SUMMARY OF THE INVENTION

The invention provides a PCI Express link state management system and link state management method thereof. When the link among devices enters the link power state, more electrical power can be saved and system break-down issue can be avoided.

The invention provides a PCI Express link power state management method applied to a link between an upstream device and a downstream device. The method includes outputting a configuration request to the downstream device to change a device power state of the downstream device, wherein the link is in a first link state. outputting a power entering signal to the upstream device; The, outputting a power request acknowledging signal to the downstream device in response to the power entering signal and counting a time period; and re-outputting the power entering signal if the link does not enter to an electrical idle state when the time period is expired.

The invention also provides a system for link state management, including an upstream device, a downstream device and a link. The upstream device outputs a configuration request to the downstream device to change a device power state of the downstream device. The downstream device outputs a power entering signal to the upstream device after receiving the configuration request. The link is connected between the upstream device and the downstream device. The data transmission between the upstream device the downstream is performed via the link. When the upstream device outputs the configuration request, the link is assumed in a first link state for normal data transmission. When the upstream device outputs a power request acknowledging signal to the downstream device in response to the power entering signal, a time period is counted. When the time period is expired, and if the link has not yet entered to an electrical idle state, then the downstream device re-outputs the power entering signal to the upstream device.

Other objects, features, and advantages of the invention will become apparent from the following detailed description of the preferred but non-limiting embodiments. The following description is made with reference to the accompanying drawings.

DETAILED DESCRIPTION OF THE INVENTION

In the PCI Express specification, the active state power management (ASPM) of hardware mechanism is used to process the transition from the L0s state to the L1 state.

Besides, the PCI Express also has software controlled programmed power management (PPM). However, when the link between an upstream device and a downstream device should be transited from the L0 state to the L1 state by software, the upstream device asserts commands for transiting the downstream device to a non-Do power state, which easily causes the system to break down due to poor signal transmission.

Figure 1:
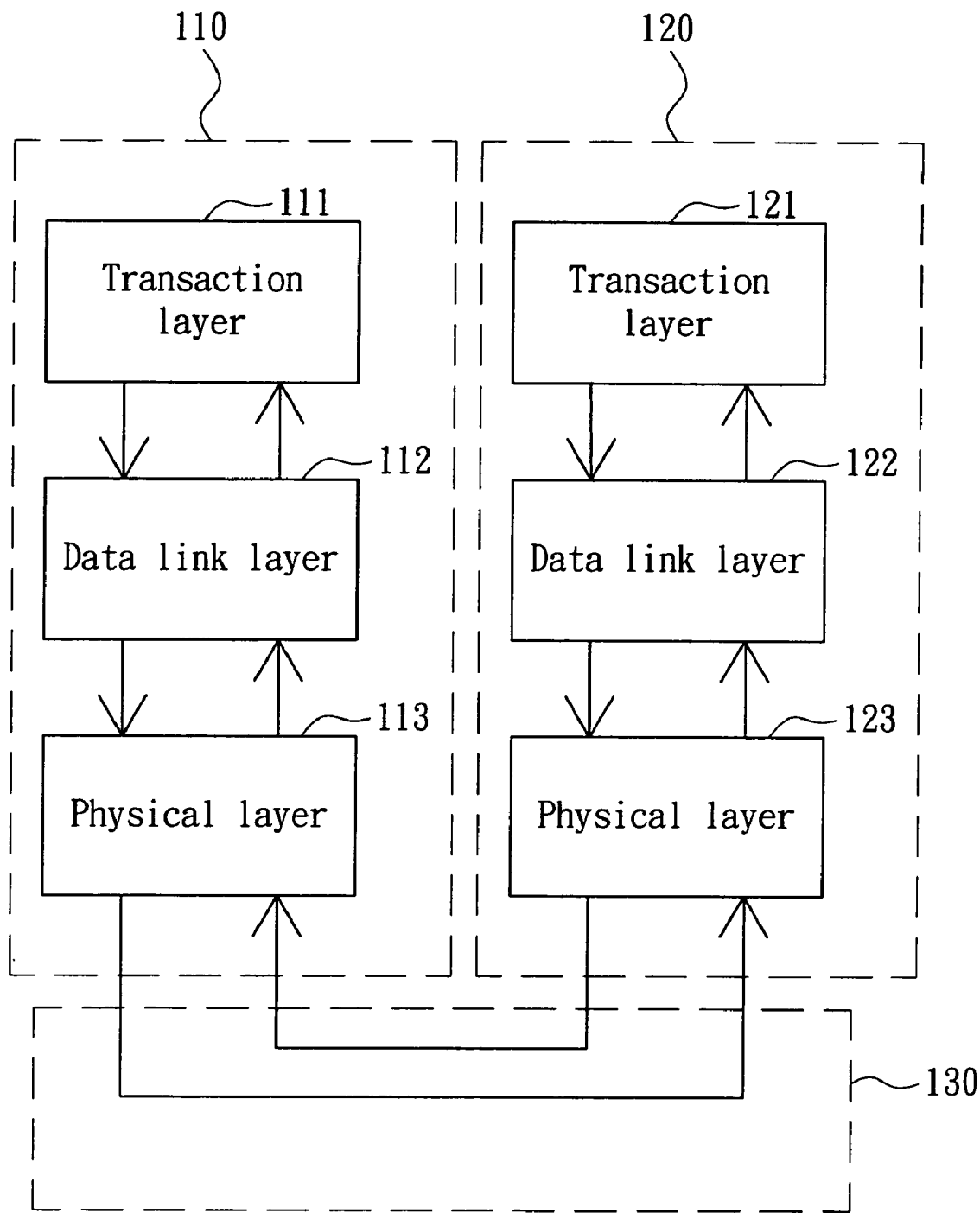
FIG. 1 is a block diagram of a PCI Express link power state transition system according to a preferred embodiment of the invention.

Referring to FIG. 1, a block diagram of a PCI Express data transmission system according to the invention is shown. The PCI Express data transmission system includes an upstream device 110, a downstream device 120 and a link 130. The link 130 is electrically connected between the upstream device 110 and the downstream device 120.

The upstream device 110 includes a transaction layer (TL) 111, a data link layer (DLL) 112 and a physical layer (PHY) 113. The transaction layer 111 generates and transmits data packets to the data link layer 112, or receives data packets from the data link layer 112. The transaction layer 111 also manages the flow control among the transaction layer 111 and devices. The data packets received or generated by the transaction layer 111 are regarded as transaction layer packets (TLPs).

The data packets transmitted between the data link layer 112 and the physical layer 113 are regarded as data link layer packets (DLLPs). The data link layer 112 receives the data packet and then provides the transaction layer packet to the transaction layer 111. Or the data link layer 112 receives the transaction layer packet outputted from the transaction layer 111 and then outputs the data packet to the physical layer 113. The data link layer 112 can further error detecting for stably transmitting packets as performing the above-mentioned operation.

The physical layer 113 takes charge of transmitting packets via the link between the upstream device 110 and the downstream device 120. The physical layer 113 receives packets from the downstream device 120 and then outputs data link layer packets (DLLPs) to the data link layer 112 via the link.

The downstream device 120, similar to the upstream device 110, includes a transaction layer 121, a data link layer 122 and a physical layer 123. The operation of each layer is similar to those of the upstream device 110, and thus any detail is not necessarily given here.

Figure 2:
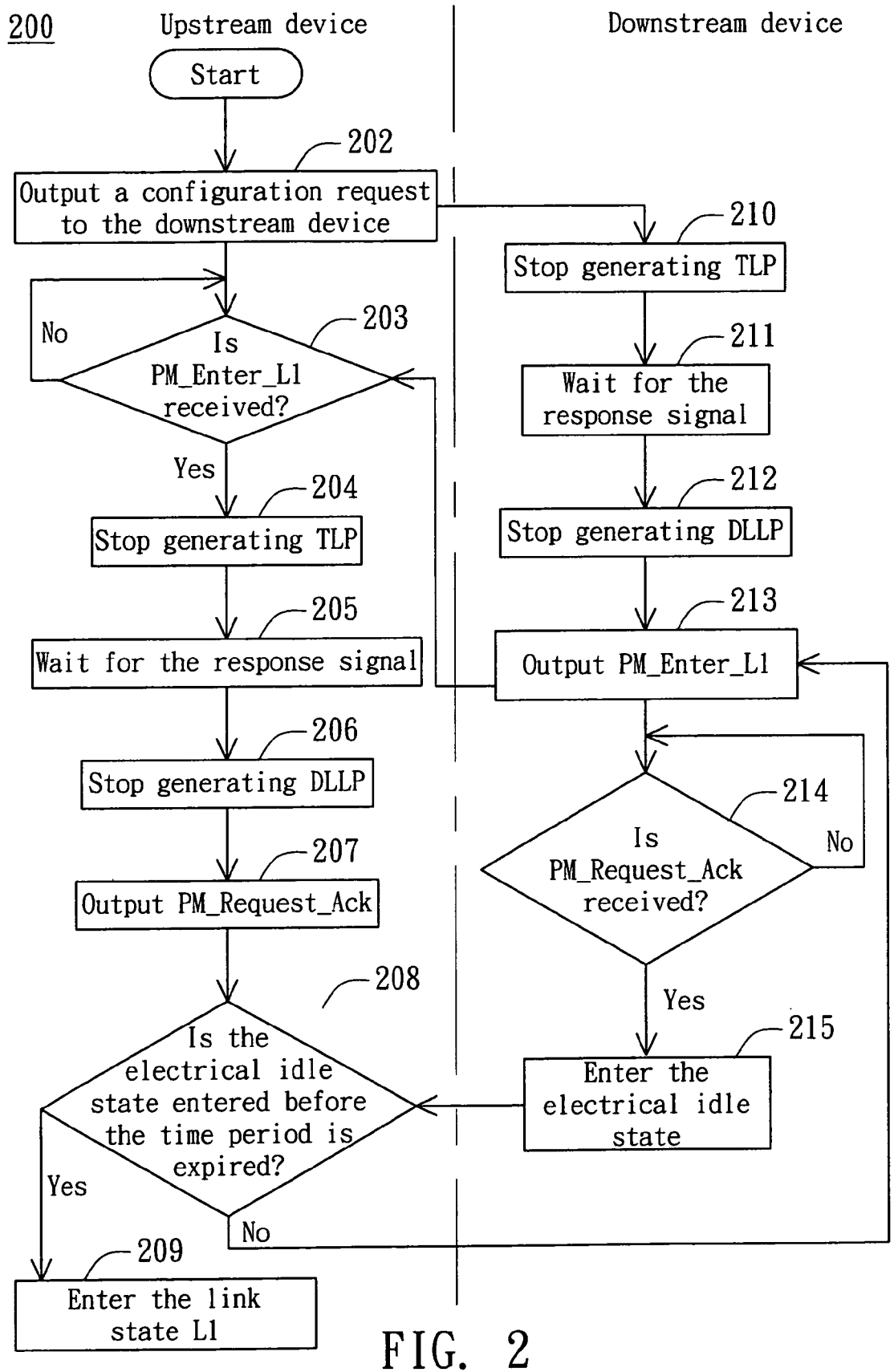
FIG. 2 is a flow chart of a PCI Express link power state transition method according to a preferred embodiment of the invention.

Referring to FIG. 2, a flow chart 200 of a PCI Express link state management method according to the invention is shown.

In step 202, the power management of the upstream device 110 outputs a configuration request to the downstream device 120 to change the device power state, such as D1, D2 or D3hot, of the downstream device 120. At the time, the link 130 between the upstream device 110 and the downstream device 120 is assumed in a first link state which is a normal operation state, such as the link power state L0. In the present invention, assume the configuration request is a transaction packet; and the upstream device 110 is a root complex and downstream device 120 is an endpoint, such as a display card.

In step 210, the downstream device 120 stops generating the transaction layer packets (TLPs) in response to the configuration request. Next, in step 211, the downstream device 120 waits for receiving a response signal generated by the upstream device 110 as responding to the previous transaction layer packet. In step 212, the downstream device 120 stops generating data link layer packets (DLLPs) except for a power entering signal, PM_Enter_L1. In step 213, the downstream device 120 outputs the power entering signal PM_Enter_L1, to the upstream device 110, and then in step 214, the downstream device 120 detects if a power request acknowledging signal, PM_Request_Ack, is received, wherein the power request acknowledging signal, PM_Request_Ack, is asserted by the upstream device 110 to notify the reception of the power entering signal, PM_Enter_L1.

In step 203, the upstream device 110 determines whether the power entering signal, PM_Enter_L1, is received. In step 204, the upstream device 110 stops generating transaction layer packets (TLPs) after receiving the power entering signal, PM_Enter_L1. Then, in step 205, the upstream device 110 waits for receiving the response signal of the previous transaction layer packet. In step 206, the upstream device 110 stops generating data link layer packets (DLLPs) except for the power request acknowledging signal, PM_Request_Ack.

In step 207, the upstream device outputs the power request acknowledging signal, PM_Request_Ack, to the downstream device 120 and starts to count a time period. After the downstream device 120 receives the power request acknowledging signal, PM_Request_Ack, the link 130 enters to an electrical idle state as shown in step 215.

When the time period is expired, if the link 130 has entered to the electrical idle state, the operations of physical layer are stopped. Therefore, the data transmission is stopped and then the link 130 enters to a second link state as shown in step 209. In the invention, assume the second link state is the L1 state.

When the time period is expired, if the link 130 has not yet entered to the electrical idle state, then goes back to the step 213, the downstream device 120 sends out the power entering signal, PM_Enter_L1, again.

As mentioned above, it can be known that in the invention, the downstream device 120 will continuously output the power entering signal, PM_Enter_L1, to the upstream device 110 until the downstream device 120 receives the power request acknowledging signal, PM_Request_Ack. Moreover, if the downstream device 120 has exactly received the power request acknowledging signal, PM_Request_Ack, from the upstream device 110, the link 130 enters to the electrical idle state. If the downstream device 120 has not yet received the power request acknowledging signal, PM_Request_Ack, the link 130 wouldn't enter to the electrical idle state.

In the invention, a time period is introduced to the upstream device 110. When the upstream device 110 outputs the power request acknowledging signal, PM_Request_Ack, the time period starts to count. When the time period is expired, if the power request acknowledging signal, PM_Request_Ack, is not received, the downstream device 120 re-outputs the power entering signal, PM_Enter_L1, to prevent the system from being broken down due to all-the-time wait for the power request acknowledge signal, PM_Request_Ack.

According to the above description, it can be found that the invention prevents the over waiting of the system when the upstream device 110 does not receive the power entering signal, PM_Enter_L1, or when the downstream device 120 does not receive the power request acknowledging signal, PM_Request_Ack.

In step 207, the time period is programmable. In the invention, the time period is assumed as 32 periods, 64 periods or a period of continuously waiting for the electrical idle state.

In the PCI Express link power state management system and method thereof disclosed by the above-mentioned embodiment of the invention, when the link state is changed, the link among devices exactly enters the link power state L1 in a counting way, thereby not only reducing power consumption but also preventing system break down in the power state transition.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for managing link state, applied to a link connected between a upstream device and a downstream device, the method comprising:

outputting a configuration request to the downstream device to change a device power state of the downstream device, wherein the link is in a first link state;

outputting a power entering signal to the upstream device;

outputting a power request acknowledging signal to the downstream device in response to the power entering signal and counting a time period; and re-outputting the power entering signal if the link does not enter to an electrical idle state when the time period is expired.

2. The method according to claim 1, wherein the downstream device further comprising:

stopping generating the transaction layer packets (TLPs) in response to the configuration request;

waiting for receiving a response signal of a previous transaction layer packet generated from the upstream device; and stopping generating the data link layer packets (DLLPs).

3. The method according to claim 1, wherein the upstream device further comprising:

stopping generating the transaction layer packets after receiving the power entering signal;

waiting for receiving a response signal of a previous transaction layer packet generated from the downstream device; and stopping generating the data link layer packets.

4. The method according to claim 1, wherein the configuration request is a transaction layer packet, the power entering signal is a data link layer packet, and the power request acknowledging signal is a data link layer packet.

5. The method according to claim 1, wherein the first link state is L0 state.

6. The method according to claim 1, further comprising:

stopping the data transmission and transiting the link to a second link state when the link enters to the electrical idle state before the time period is expired.

7. The method according to claim 6, wherein the second link state is L1 state.

8. The method according to claim 1, wherein the time period is substantially 32 periods, 64 periods or a period of continuously waiting for the power request acknowledging signal.

9. The method according to claim 1, wherein the method is applied to a PCI Express link.

10. A system for link state management, comprising:

an upstream device;

a downstream device; and a link, for coupling the upstream device and the downstream device, wherein the data transmission between the upstream device the downstream is performed via the link;

wherein the upstream device outputs a configuration request to the downstream device to change a device power state of the downstream device, and the downstream device outputs a power entering signal to the upstream device after receiving the configuration request, and the link is set in a first link power state for normal data transmission;

wherein when the upstream device outputs a power acknowledging response signal to response the power entering signal, a time period is counted; if the link has not yet entered an electrical idle state when the time period is expired, the downstream device re-outputs the power entering signal.

11. The system according to claim 10, wherein both the upstream device and the downstream device comprise a transaction layer, a data link layer and a physical layer.

12. The system according to claim 11, wherein the configuration request is a transaction layer packet, the power entering signal is a data link layer packet, and the power request acknowledging signal is a data link layer packet.

13. The system according to claim 11, wherein when receiving the configuration request, the transaction layer of the downstream device stops generating transaction layer packets and the data link layer of the downstream device stops generating data link layer packets.

14. The system according to claim 11, wherein when receiving the power entering signal, the transaction layer of the upstream device stops generating transaction layer packets and the data link layer of the upstream device stops generating data link layer packets.

15. The system according to claim 10, wherein the first link state is L0n state.

16. The system according to claim 10, wherein when the time period is expired and the link enters to the electrical idle state, the upstream device stops data transmission and the link further enters to a second link state.

17. The system according to claim 16, wherein the second link state is L1 state.

18. The system according to claim 10, wherein the upstream device is a root complex, and the downstream device is an endpoint.

19. The system according to claim 10, wherein the time period is substantially 32 periods, 64 periods or a period of continuously waiting for the power request acknowledging signal.

20. The system according to claim 10, wherein the system is a PCI Express link system.

* * * * *

UNITED STATES PATENT AND TRADEMARK OFFICE
CERTIFICATE OF CORRECTION

PATENT NO. : 7,607,029 B2
APPLICATION NO. : 11/430122
DATED : October 20, 2009
INVENTOR(S) : Tseng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this

Twelfth Day of October, 2010

David J. Kappos
*Director of the United States Patent and Trademark Office*